(12) United States Patent
Obaidi

(10) Patent No.: US 11,716,599 B2
(45) Date of Patent: Aug. 1, 2023

(54) METHODS FOR DYNAMICALLY PROVISIONING A VIRTUAL SIM CARD

(71) Applicant: T-Mobile USA, Inc., Bellevue, WA (US)

(72) Inventor: Ahmad Arash Obaidi, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/382,744

(22) Filed: Jul. 22, 2021

(65) Prior Publication Data

US 2021/0352456 A1 Nov. 11, 2021

Related U.S. Application Data

(63) Continuation of application No. 16/426,501, filed on May 30, 2019, now Pat. No. 11,102,633.

(51) Int. Cl.
*H04W 4/60* (2018.01)

(52) U.S. Cl.
CPC .................... *H04W 4/60* (2018.02)

(58) Field of Classification Search
CPC ........... H04W 12/002; H04W 12/0023; H04W 12/004; H04W 48/18; H04W 4/60
See application file for complete search history.

(56) References Cited

U.S. PATENT DOCUMENTS

| | | | |
|---|---|---|---|
| 9,763,182 B1 | 9/2017 | Krishnamurthy et al. | |
| 11,483,689 B1* | 10/2022 | Holmes | H04W 4/60 |
| 2002/0087674 A1 | 7/2002 | Guilford et al. | |
| 2004/0235458 A1 | 11/2004 | Walden et al. | |
| 2004/0236826 A1 | 11/2004 | Harville et al. | |
| 2006/0253596 A1 | 11/2006 | Barone et al. | |
| 2010/0311402 A1* | 12/2010 | Srinivasan | H04W 8/183 455/418 |
| 2012/0047227 A1 | 2/2012 | Haggerty et al. | |
| 2012/0129513 A1 | 5/2012 | van der Laak | |
| 2012/0276872 A1 | 11/2012 | Knauth et al. | |
| 2013/0023235 A1* | 1/2013 | Fan | H04W 12/35 455/418 |
| 2015/0163827 A1 | 6/2015 | Ekici | |
| 2019/0246265 A1* | 8/2019 | Schell | H04W 8/205 |
| 2021/0127256 A1* | 4/2021 | Li | H04W 8/18 |
| 2021/0195426 A1* | 6/2021 | Tamura | H04W 12/40 |

* cited by examiner

*Primary Examiner* — Minjung Kim
(74) *Attorney, Agent, or Firm* — Troutman Pepper Hamilton Sanders LLP; James E. Schutz; Christopher C. Close, Jr.

(57) ABSTRACT

A method for dynamically provisioning virtual subscriber identity modules (SIMS) to enable a user equipment (UE) to use a service from a service provider. The method can include a UE transmitting a user request to a virtual SIM marketplace. The virtual SIM marketplace can receive a plurality of service offers from a plurality of service providers. The virtual SIM marketplace can match details in the user request with offers made by the plurality of service providers. When a match is found, the virtual SIM marketplace can send user information from the user request to the matching provider. The provider can then send a SIM over-the-air (OTA) message to the UE. The UE can use the SIM-OTA message to enable the UE to provide a user device service on the provider's network.

17 Claims, 7 Drawing Sheets

METHODS FOR DYNAMICALLY PROVISIONING A VIRTUAL SIM CARD

CROSS REFERENCE TO RELATED APPLICATIONS AND PRIORITY CLAIM

This application is a continuation of, and claims priority under 35 U.S.C. § 120 to, U.S. patent application Ser. No. 16/426,501, of the same title, filed May 30, 2019, which is incorporated herein as if fully set forth below.

FIELD

Examples of the present disclosure relate generally to providing a cellular services marketplace and, more particularly, to systems and methods for choosing and providing services and service details to be associated with a dynamically provisioned virtual subscriber identity module (SIM) card.

BACKGROUND

User equipment (UE) (e.g., cell phones, smart phones, etc.) has become increasingly popular and complex. UEs can perform numerous functions including, for example, voice, text, and data streaming. To engage in these functions, UEs use a connection to a cellular, WiFi, or other type of network. Regarding cellular networks, users often subscribe to a catch-all cellular provider. These cellular providers offer talk, text, data streaming, and/or other services as one inclusive subscription.

To connect to a cellular provider, UEs may use a physical subscriber identity module (SIM) card. Unfortunately, the design of a SIM card is limiting because SIMS are only capable of being provisioned by one provider for all service. As a result, users are forced to select from plans offering a bundled package of services, rather than individual services tailored to their needs. Further, in some situations, such as international travel, users often must either add an expensive international plan or buy a SIM card at an international location. The latter of which requires the user to change out their domestic SIM card for the international SIM card.

The use of virtual SIMS, on the other hand, may offer an alternative to the traditional SIM card and its limitations by allowing the UE to receive services individually from multiple providers of the user's choice. Accordingly, there is a need for improved systems and methods for dynamically provisioning a virtual SIM card to receive one or more services from one or more providers. More specifically, a need exists for connecting UEs to multiple providers, each offering various services, and dynamically provisioning the virtual SIM card to enable those services.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Examples of the present disclosure relate generally to systems and methods for dynamically provisioning a virtual subscriber identity module (SIM). The method may include user equipment (UE), a virtual SIM marketplace, and one or more providers in communication. A user may request, through the UE (or an application on the UE), a service offered at the virtual SIM marketplace. The user may also include his preferences (e.g., a data package of 20 GB/month for $9.99 or less) in the request. The virtual SIM marketplace can include a listing of the services and service details offered by numerous providers and determine an appropriate provider, or providers, for the user. Once chosen—either by the user or automatically by the virtual SIM marketplace—the virtual SIM marketplace can provide the user's information and preferences to the chosen provider. The provider can then communicate with the UE by sending a SIM over-the-air ("SIM-OTA") message, which provisions the UE to receive cellular, and other services from the provider. In response, the UE can dynamically provision a virtual SIM associated with the provider and the service(s). As a result, the UE may utilize the requested service(s) (e.g., text messaging, voice calling, etc.) via the provider.

Reference will now be made in detail to examples of the disclosed technology, examples of which are illustrated in the accompanying drawings and disclosed herein. Wherever convenient, the same reference numbers will be used throughout the drawings to refer to the same or like parts.

Figure 1:
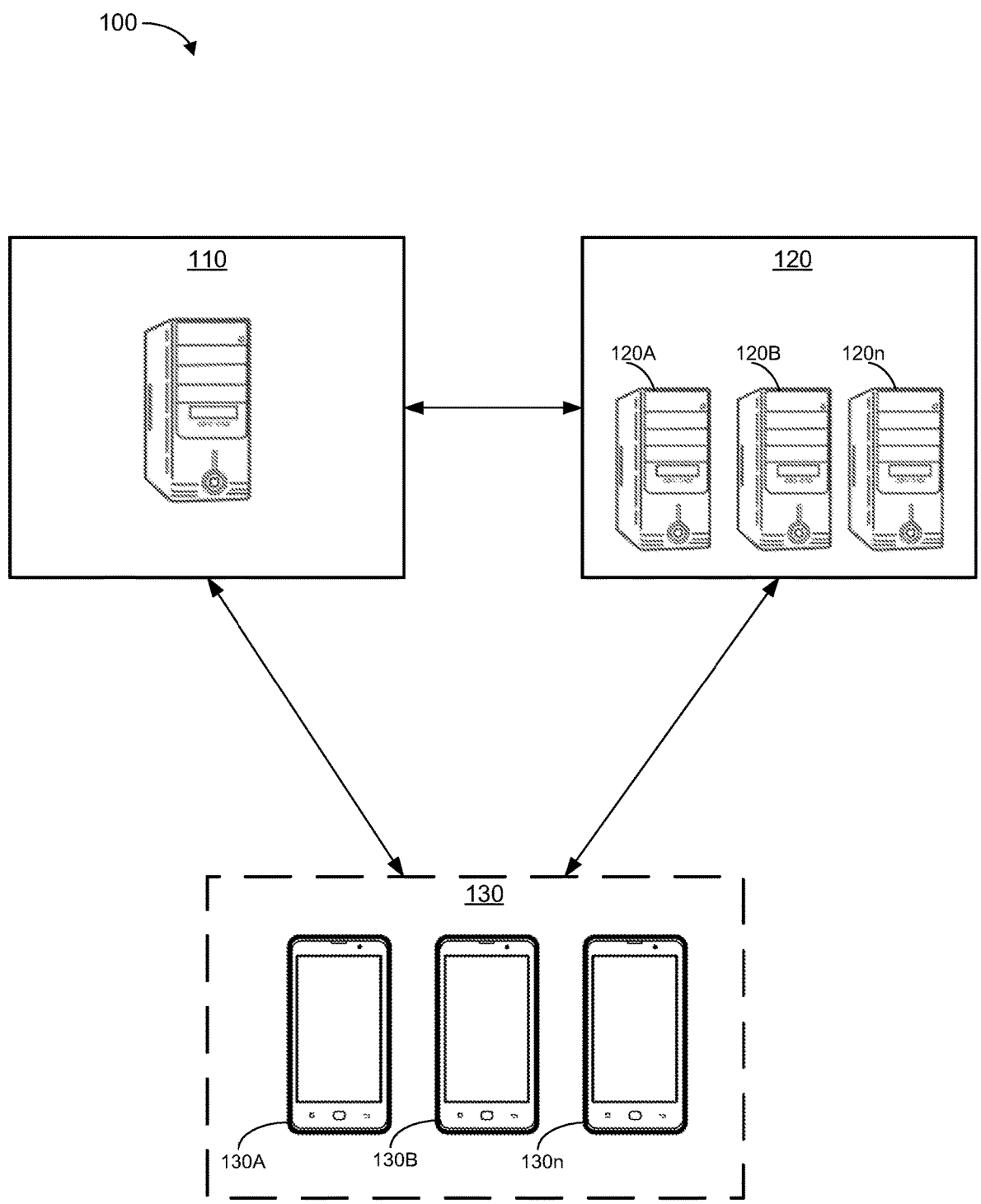
FIG. 1 is a diagram of an example of a system comprising a marketplace of service providers for selling and provisioning multiple virtual subscriber identity modules (SIMS) for users' equipment (UEs), in accordance with some examples of the present disclosure.

As shown in FIG. 1, an example of the present disclosure can comprise a system 100 for providing a virtual SIM marketplace 110. The components and arrangements shown in FIG. 1 are not intended to limit the disclosed embodiments, as these components and features may vary. As shown in FIG. 1, in some implementations, the system 100 can include a virtual SIM marketplace 110, one or more providers 120 (e.g., providers 120A-120n), and one or more UEs 130 (e.g., UEs 130A-130n). The virtual SIM marketplace 110, the providers 120, and the UEs 130 may each include one or more processors and/or one or more transceivers. As non-limiting examples, the UEs 130 may be cell phones, smartphones, laptop computers, tablets, or other personal computing devices that include the ability to communicate on one more different types of networks. The virtual SIM marketplace 110 and/or the providers 120 may include one or more physical or logical devices (e.g., servers, cloud servers, etc.) or drives. Example computer architectures that may be used to implement the UEs 130, the virtual SIM marketplace 110, and the providers 120 are described below with reference to FIGS. 5, 6A, and 6B, respectively.

In some examples, the virtual SIM marketplace 110 may communicate with the UE 130 and the provider 120. The virtual SIM marketplace 110 may request a listing of the available services (e.g., talk, text, and data) from at least one of the providers 120 (e.g., a first provider 120A). Further, the virtual SIM marketplace 110 may request corresponding service details (e.g., pricing, bundling deals, and family plans) from the providers 120. The virtual SIM marketplace 110 may organize the corresponding service details by price, service quality, location, etc., to enable the virtual SIM marketplace 110 to match existing offers with service requests from UEs 130.

The virtual SIM marketplace 110 may also receive a user request from a UE 130 (e.g., a first UE 130A). The user request may seek information (e.g., services, service details, costs, etc.) relating to information contained within the listings received by the virtual SIM marketplace 110. The user request may request information on which of the providers 120 have a cellular talk plan available for $40/month or less, for example. Based on the information provided in the user request, the virtual SIM marketplace 110 can determine one or more providers 120 that match the user request.

The virtual SIM marketplace 110 may also receive customer information and UE information from the UEs 130. The customer information and/or the UE information may be provided as part of the user request or separately. In some examples, where the customer information and/or the UE information are provided separately, the virtual SIM marketplace 110 may transmit a request to a UE 130 for the customer information or the UE information. The customer information may include the user's social security number, first and last name, address, permission to perform a credit check, and other information typically used to establish an account with a cellular provider. In some examples, this information can be stored in a user profile associated with the virtual SIM marketplace 110 (e.g., in an application on the UE 130). The UE information may include an International Mobile Equipment Identity (IMEI), SIM identification (ID), Universal Integrated Circuit Card (UICC) number, international mobile subscriber identity (IMSI), integrated circuit card identifier (ICCID), mobile subscription identification number (MSIN), etc. to enable the virtual SIM marketplace 110 and/or the providers 120 to identify the user and/or the UE 130 and to provision the UE 130.

According to some examples, the virtual SIM marketplace 110 may transmit the customer information to a credit bureau (e.g., Experian®, Transunion®, Equifax®). In response, the virtual SIM marketplace 110 may receive the user's credit score from the credit bureau. In some examples, based at least in part on the user's credit score, the virtual SIM marketplace 110 may identify one or more services and the associated service details, for example, that require a minimum credit score. In other examples, the virtual SIM marketplace 110 may provide the credit score to one or more providers 120 for approval.

The user request may also grant permission to the virtual SIM marketplace 110 to enable a matching provider 120 (e.g., the first provider 120A) to provide service to the UE 130 automatically (i.e., without additional input or approval from the user). In some examples, after identifying the matching provider 120, the virtual SIM marketplace 110 may transmit a message to the UE 130 notifying the user of the matching provider 120. In examples where user permission is not included within the user request (or within the application), the message may also include a web link, checkbox, or other element that, when clicked, grants permission to the matching provider 120 to provide the requested service. After receiving the user's permission, the virtual SIM marketplace 110 may communicate with the matching provider 120. The virtual SIM marketplace 110 may send instructions to the matching provider 120 to provide the requested service to the UE 130. The instructions may include, for example, the UE information, the customer information, and/or the service details for the selected package.

In some examples, the providers 120 can each provide one or more network services and can communicate with the virtual SIM marketplace 110. When selected by the user, the providers 120 may also communicate with the UE 130. As mentioned above, the providers 120 may receive a request for a service listing from the virtual SIM marketplace 110. The service listing may include services, service details, and/or contract terms. Each of the providers 120 may send data representative of the services it offers, and the corresponding service details for each, to the virtual SIM marketplace 110. When chosen by the user, the matching provider 120 may receive instructions from the virtual SIM marketplace 110 to provide one or more services to the UE 130. The instructions may include the UE information, customer information, and other information relating to the request and the user requesting the services offered by the matching provider 120. Based on user data, the matching provider 120 can generate a SIM-OTA message. The user data may include UE information (e.g., SIM data, mobile user device identification), customer information (e.g., social security number, first and last name, address, payment information), a user preference, and/or a user equipment service. The matching provider 120 can then send the SIM-OTA message to the UE 130 using the information provided in the user data. Further, the Mobile Country Code (MCC), Mobile Network Code (MNC), and Group ID (GID) of the matching provider 120 may be sent to the UE 130 as part of the SIM-OTA message, or separately. The MCC, MNC, and GID may be required to provision a virtual SIM on the UE 130, which allows the network operator of the device to be changed. Indeed, the SIM-OTA message can be used to configure the virtual SIM on the UE 130, such that the UE 130 can receive the requested service from the matching provider 120.

The UE 130 may communicate with the virtual SIM marketplace 110 and at least one of the providers 120 (e.g., the first provider 120A). The UE 130 may transmit the user request to the virtual SIM marketplace 110. The user request may include the user data. In some examples, the user request may include a selection of an offered service.

In some examples, the UE 130 may download a mobile application (e.g., a marketplace app 512, discussed below) associated with the virtual SIM marketplace 110. The mobile application may provide communication between the UE 130, the virtual SIM marketplace 110, and/or the providers 120. The UE 130 may receive notifications and/or information regarding provider services and service details, for example, from the virtual SIM marketplace 110 via the mobile application. The UE 130 may also transmit the user request to the virtual SIM marketplace 110 via the mobile application.

As mentioned above, the user request may grant permission to the virtual SIM marketplace 110 and/or the matching provider 120 to provide the requested service(s) to the UE 130. The matching provider 120 may communicate with the UE 130 via a mobile application (e.g., the marketplace app 512 or a separate provider app 514, discussed below). In some examples, the UE 130 may transmit a separate message to the virtual SIM marketplace 110 and/or the matching provider 120 granting permission to provide the requested service to the UE 130. From the matching provider 120, the UE 130 may receive the SIM-OTA message. Using the SIM-OTA message, the UE 130 may be provisioned to the enable the UE 130 to use the requested service(s).

Provisioning the UE 130 may include the UE 130 determining whether the UE 130 already has the requested service (e.g., text messaging or a data package). When the UE 130 has the service (i.e., there is an existing subscription for the same service), the UE 130 may determine that a first virtual SIM is associated with the existing service, remove the existing service from the first virtual SIM, generate a second virtual SIM using the data in the SIM-OTA message, and assign the requested service to the second virtual SIM. Alternately, when the UE 130 lacks the requested service, the UE 130 can generate a first virtual SIM and based on the SIM-OTA message, associate the requested service with the first virtual SIM.

Figure 2:
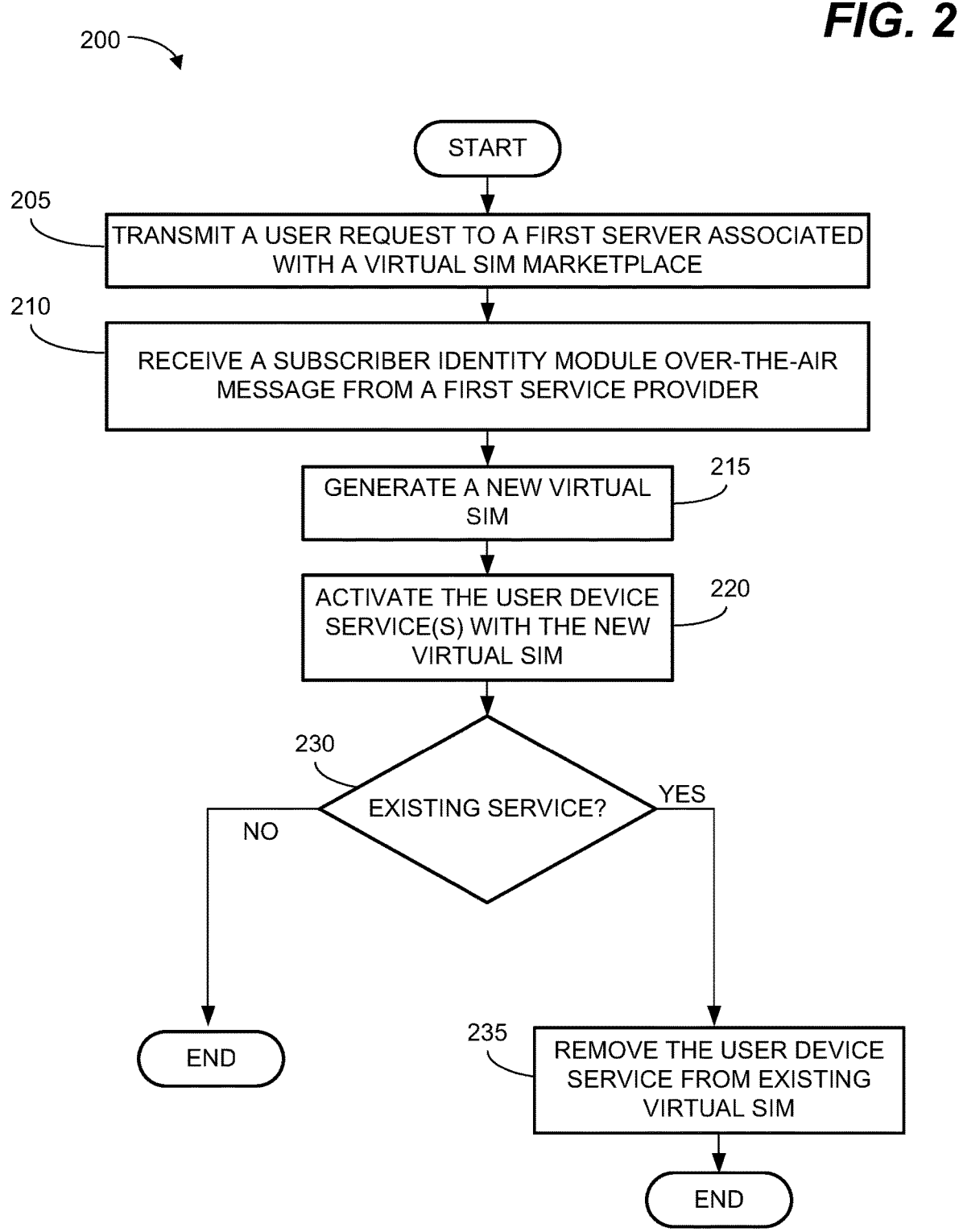
FIG. 2 is a flowchart depicting an example of a method for dynamically provisioning a virtual SIM from the perspective of a UE, in accordance with some examples of the present disclosure.

FIG. 2 illustrates a flowchart for an example of a method for dynamically provisioning a virtual SIM. The flowchart is written from the perspective of the UE 130 in communication with the virtual SIM marketplace 110 to receive information on available services and service details offered by the providers 120. The UE 130 further communicates with at least one of the providers 120 to dynamically provision a virtual SIM such that one or more services may be provided by the matching provider 120.

At 205, the UE 130 may transmit the user request to the virtual SIM marketplace 110. In some examples, the user request may be transmitted by the transceiver associated with the UE 130. Further, the user request may be transmitted to a first server associated with the virtual SIM marketplace 110. The user request may include user data (e.g., UE information, customer information, a user preference, and/or a service). At 210, the UE 130 may receive a SIM-OTA message from the matching provider 120 (e.g., first provider 120A). The first provider 120A may be the provider 120 most closely matching the user request, as determined by the virtual SIM marketplace 110.

At 215, the UE 130 (e.g., a processor on the UE 130) may generate a new virtual SIM using the SIM-OTA message. When received by the UE 130, the SIM-OTA message may cause the UE 130 to create the virtual SIM (e.g., a trustlet or a small agent) within a secure element of the UE 130, such as the trusted execution environment (TEE). In examples where the new SIM credentials (e.g., MNC, MCC, and GID) are received separately from the SIM-OTA message, the secure element may store the new SIM credentials for later use for generating the virtual SIM, which may be performed, for example, by an embedded SIM (e-SIM), e.g., e-SIM 530, discussed below. The e-SIM may be located within the secure element or located within the normal operating system (OS) and communicate to the SIM-OTA platform via a secure channel. Further, the e-SIM may send a secure message to generate the virtual SIM and to associate the values of MNC, MCC, and GID. The e-SIM may switch between various virtual SIMS (e.g., virtual SIMS 532A-532*n*) to change the communications channels and/or antennas for the UE 130.

At 220, the UE 130 may activate the service with the new virtual SIM. In some examples, the UE 130 may include one antenna (e.g., antenna 534). In those examples, the e-SIM may communicate with each of the providers 120 and determine the frequencies of communication (generally a frequency pair—one for uplink and one for downlink). The frequencies may vary by provider and/or by the type of service being used (e.g., talk, text, data, IoT) with each provider and/or service generally allocated a particular frequency spectrum. In this configuration, the eSIM, transceiver, or OS (via the processor), for example, can provide a multiplexing function to enable each virtual SIM to use the antenna (e.g., to send and receive data packets) at the appropriate frequency and at the appropriate time. In other words, each virtual SIM or each frequency can use the single antenna with "traffic control" provided by one or more components of the UE 130.

In some examples, the traffic control can be provided on a time divided basis. The time divided basis can use a first-in-first-out (FIFO) basis, for example, a time to transmit basis (i.e., smaller packets go before larger packets, or vice-versa), a latency basis (i.e., packets for networks with higher or lower latency go first), or any other suitable time-based scheme. In other examples, the traffic control can be provided on a priority basis. In other words, packets associated with services that require low latency (e.g., voice calls or streaming) can be sent and received before, for example, packets associated with services that can tolerate higher latency (e.g., text messaging or e-mail).

In other examples, each virtual SIM may be associated with a separate antenna; for example, virtual SIM A (e.g., virtual SIM 532A) may be associated with antenna A (e.g., antenna 534A), and virtual SIM B may be associated with antenna B, etc. In those examples, the SIM-OTA can instruct the processor, for example, to assign each virtual SIM to a particular antenna. The SIM-OTA message can also include the appropriate frequency (or frequency pair), provider information (e.g., the MCC, MNC, GID, etc.), and other data to enable the virtual SIM to communicate on the appropriate frequency and with the appropriate provider.

In those examples, the e-SIM, transceiver, or processor, for example, may determine and route communications to and from the appropriate virtual SIM. The appropriate virtual SIM may be chosen based on the type of service (e.g., 2G, 3G, 4G, or 5G), the provider, or the priority. So, for example, autonomous driving functions—which require very low latency—may be assigned to a first virtual SIM on a 5G network and the virtual SIM may be given high priority when sending and receiving data. Text messaging, on the other hand, which can tolerate relatively high latency, may be assigned to a second virtual SIM on a 3G (legacy) network and be given low priority when sending and receiving data. In some examples, user preferences may determine the appropriate virtual SIM—e.g., the user has exclusively designated a particular service provider for a particular service. Once the virtual SIM is provisioned, the UE 130 can receive the service from the matching provider 120.

At 230, the UE 130 may determine whether the SIM-OTA message includes an existing service. When the user request includes text messaging, for example, the UE 130 may determine whether the user has an existing text messaging subscription. If the UE 130 determines the service already exists, then at 235, the UE 130 may remove the existing service from the first virtual SIM, delete the first virtual SIM, or deactivate the first virtual SIM. In some examples, rather than deleting an existing virtual SIM, the existing virtual SIM may be re-provisioned. When the virtual SIM is re-provisioned, certain associated data (e.g., provider name, communication frequency, MNC, MCC, and GID) can be removed from the virtual SIM and replaced with new data corresponding to the new provider and/or type of service.

Figure 3:
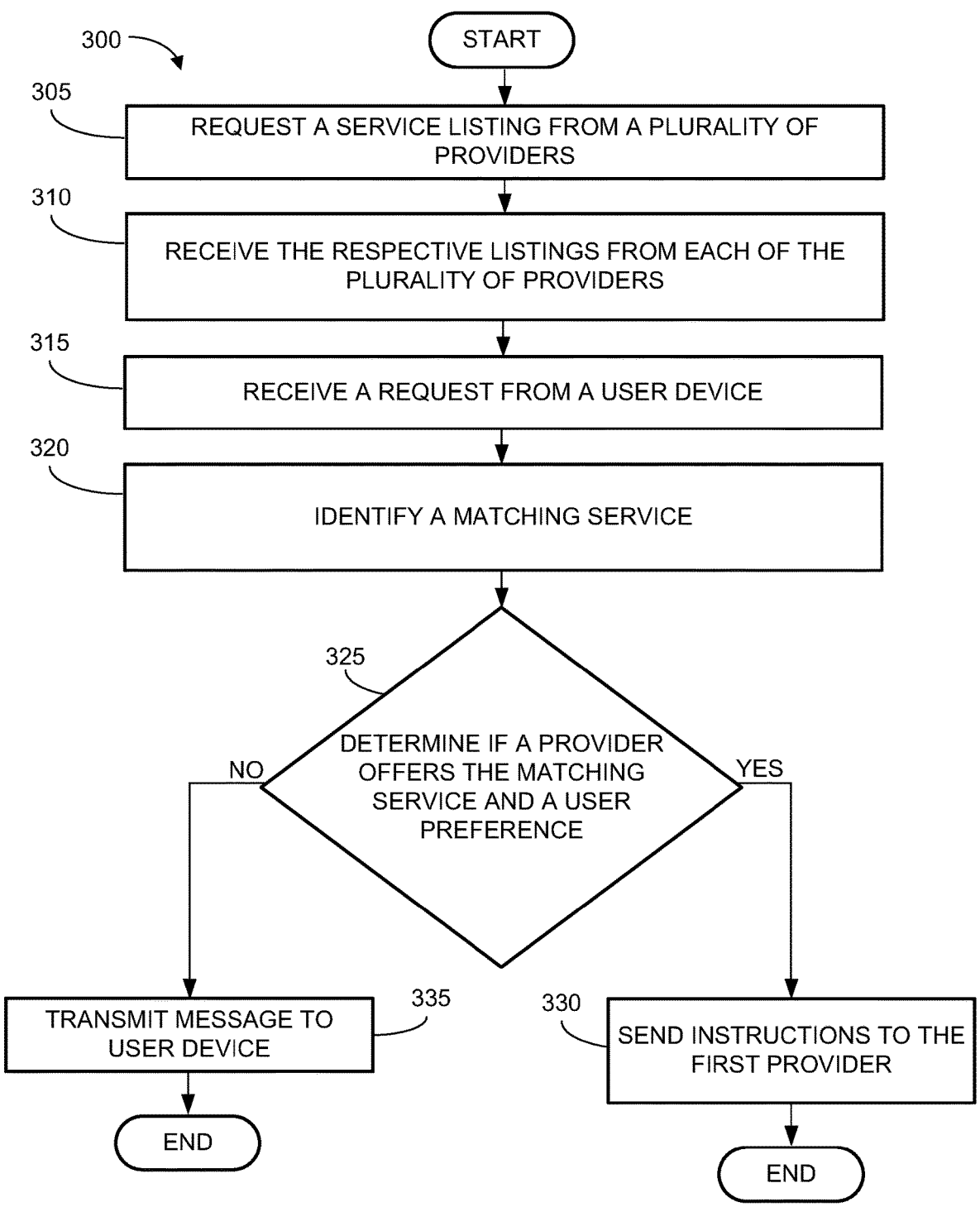
FIG. 3 is another flowchart depicting an example of a method for dynamically provisioning a virtual SIM from the perspective of a virtual SIM marketplace, in accordance with some examples of the present disclosure.

FIG. 3 illustrates a flowchart for an example of a method 300 for dynamically provisioning a virtual SIM. The flowchart illustrates the method 300 from the perspective of the virtual SIM marketplace 110. The virtual SIM marketplace 110 may communicate with the providers 120 (e.g., providers 120A-120n) to determine the services and associated service details (e.g., costs, data allowance, etc.) for each provider 120. Further, the virtual SIM marketplace 110 may communicate with the UE 130 to receive requests related to the user's data and communications needs. The virtual SIM marketplace 110 matches the UE 130 with the appropriate provider 120 such that the UE 130 is provided with the desired service(s).

At 305, the method 300 may include the virtual SIM marketplace 110 transmitting a request for the service listings to the providers 120. The request for the service listing may seek information on the services provided, the associated service details, and/or contract, plan, or package details. At 310, the virtual SIM marketplace 110 may receive the respective service listings from each of the providers 120. In some examples, the request for the service listing may seek an automatic update from the providers 120 at pre-determined intervals. After receiving a first service listing from, for example, the first provider 120A, the virtual SIM marketplace 110 may continue to receive automatic updates of the first provider 120A on a recurring basis (e.g., weekly, bi-weekly, monthly). In some examples, the virtual SIM marketplace 110 may store each of the respective service listings within an associated database.

At 315, the virtual SIM marketplace 110 may receive a user request for service(s) from the UE 130. The user request may include user data (e.g., UE information, customer information, a user preference, etc.) and a request for one or more services (e.g., voice, text, data, navigation, etc.), among other things. At 320, the virtual SIM marketplace 110 may determine a matching service based on the user request. The user request may seek a text package (e.g., service), for example, with unlimited texting for $25/month or less (e.g., user preference). The virtual SIM marketplace 110 can then identify each of the service listings that include an unlimited text package and a price of $25/month or less. In some examples, the service listings may also require a customer to have a pre-determined credit score to be eligible for the respective text plan. In those examples, the virtual SIM marketplace 110 and/or the first provider 120A may perform a credit check on the user by transmitting customer information (e.g., social security number, first and last name, address, etc.) to a credit bureau. The first provider 120A may set a minimum credit score for each service listing sent to the virtual SIM marketplace 110—e.g., more expensive plans may require a higher credit score, or vice-versa. Based on the credit score of the user and the credit score requirement in each service listing, the virtual SIM marketplace 110 may further match the service listing to the customer.

At 325, the virtual SIM marketplace 110 may determine which, if any, of the providers 120 has a matching service for the user request. If the virtual SIM marketplace 110 determines one of the providers 120 (e.g., the first provider 120A) offers the matching service, then at 330, the virtual SIM marketplace 110 may send instructions to the first provider 120A. The instructions may include the UE information, the customer information, the user preference, and/or the matching service listing. In some examples, the virtual SIM marketplace 110 may also send a message to the UE 130 informing the user of the match with the first provider 120A and that the first provider should be in touch shortly.

In some examples, after sending instructions to the first provider 120A, the virtual SIM marketplace 110 may follow-up with the user and or the first provider 120A to determine whether the UE 130 received the requested service. The virtual SIM marketplace 110 may send a text message to the UE 130, for example, or create a dialog box in the marketplace app 512 to enable the user to confirm receipt. Additionally or alternatively, the virtual SIM marketplace 110 may contact the first provider 120A for confirmation. Further, before the UE 130 receives the SIM-OTA message from the first provider 120A, the user may be prompted by the e-SIM to authenticate the virtual SIM provisioning (e.g., biometrics, or username and password). Moreover, the providers 120 may blacklist certain users or UEs 130 from being allowed to be on their network. In those examples, the virtual SIM marketplace 110 may send a message to UE 130 indicating the requested service is unavailable to the user.

If the virtual SIM marketplace 110 determines that none of the providers 120 offers the matching service, on the other hand, then at 335, the virtual SIM marketplace 110 may transmit a message to the UE 130 indicating that the user request cannot be fulfilled. In some examples, the virtual SIM marketplace 110 may provide the user with the offer(s) that are closest to the user request. If the user requested unlimited text for $25/month or less, for example, but no service listing matches that request, the virtual SIM marketplace 110 may send the two or three closest matches—e.g., 1000 texts per month for $24 or unlimited texts for $30.

Figure 4:
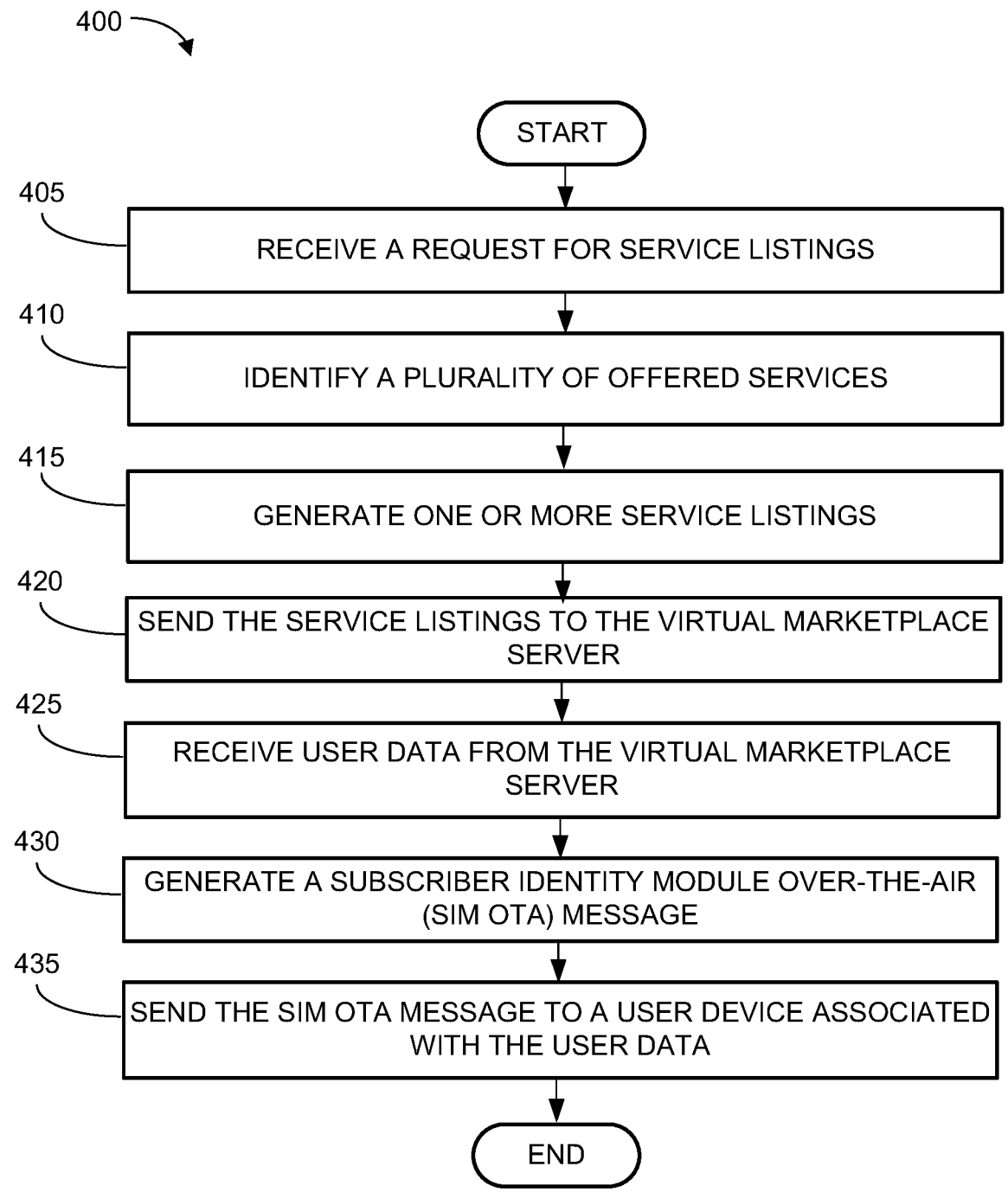
FIG. 4 is another flowchart depicting an example of a method for dynamically provisioning a virtual SIM from the perspective of a provider, in accordance with some examples of the present disclosure.

FIG. 4 is a flowchart of an example of a method 400 for dynamically provisioning virtual SIM cards. The flowchart is from the perspective of a service provider (e.g., the first provider 120A) in communication with the virtual SIM marketplace 110 and, ultimately, the UE 130. The first provider 120A may send one or more service listings to the virtual SIM marketplace 110, receive information about potential customers from the virtual SIM marketplace 110, and send information to the UE 130 to enable the UE 130 to receive one or more services from the first provider 120A.

FIG. 4 is described in terms of the first provider 120A. It should be noted, however, that any of the providers 120A-120n can perform the steps described below. At 405, the first provider 120A may receive a request for service listings from the virtual SIM marketplace 110. The request may seek all the services and the associated service details offered by the first provider 120A. In some examples, the request for the service listings may also seek the contract requirements, costs, credit score requirements, and other details associated with each of the respective services. The service listings may also include service listings for single services (e.g., text, voice, data, etc.) and/or service listings for package deals that include two or more services.

At 410, the first provider 120A may retrieve a plurality of services and/or packages from a database. The first provider 120A may offer a plurality of services and/or packages, which may be generated by a marketing department, or other entity, at the first provider 120A. The first provider 120A may offer voice only, data only, text only, voice and text (or, "talk and text"), voice and data, or any combination thereof. Voice only may be desirable for users simply wishing to replace their land line, for example, while text only may be useful for delivery drivers.

At 415, the first provider 120A can generate one or more service listings. Each service listing may include one or more services, the respective service details, the associated contract details, etc. A talk and text service listing may include, for example, unlimited talk and text for $40/month, with a minimum six-month commitment, a minimum 680 credit score, and may be offered in a single city, a single state, a region, or nationwide. Of course, the service listings may include other information such, as for example, UE 130 minimum requirements, type of connection (e.g., 3G, 4G LTE, 5G, etc.), offer expiration date, etc.

At 420, the first provider 120A may send the service listings to the virtual SIM marketplace 110. The first provider 120A may send the service listing in any suitable format, as requested by the virtual SIM marketplace 110. The first provider 120A may send all service listings together in a comma delimited text file, for example, or send each service listing separately. The first provider 120A may send the service listings using an application common to both the first provider 120A and the virtual SIM marketplace 110, for example, via text message, e-mail, or any other suitable method.

At 425, the first provider 120A may receive user data from the virtual SIM marketplace 110. Receipt of the user data may indicate that the virtual SIM marketplace 110 determined a match between a service listing for the first provider 120A and a user request. In some examples, such as when the first provider 120A has multiple service listings, the virtual SIM marketplace 110 may also provide the selected service listing to the first provider 120A.

At 430, the first provider 120A may generate the SIM-OTA message based on the user data and/or the service listing. At 435, the first provider 120A can transmit the SIM-OTA message to the UE 130. The first provider 120A may use at least portion of the user data to transmit the SIM-OTA message (e.g., the mobile phone number, ICCID, MSIN, etc.). As discussed above, the SIM-OTA message can cause the UE 130 to provision a new virtual SIM, or re-provision an existing virtual SIM, to enable the UE 130 to access the services associated with the selected service listing on the first provider's network.

Figure 5:
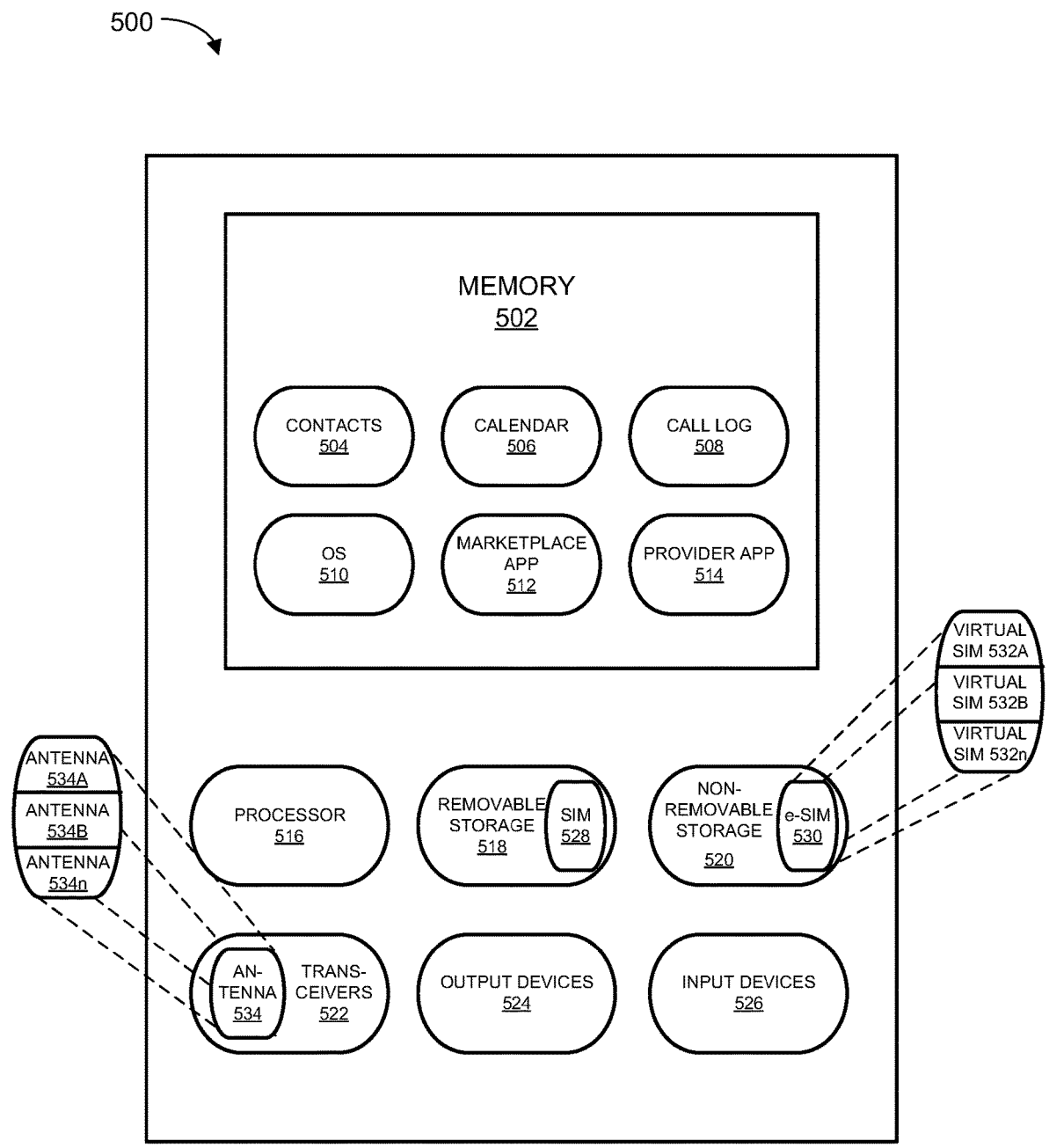
FIG. 5 is an example of a UE for use with the systems and methods disclosed herein, in accordance with some examples of the present disclosure.

As shown in FIG. 5, some, or all, of the system 100 and methods 200, 300, 400 may be performed by, and/or in conjunction with, the UE 130. For clarity, the UE 130 is described herein generally as a cell phone or smart phone. One of skill in the art will recognize, however, that the system 100 and methods 200, 300, 400 may also be used with a variety of other electronic devices, such as, for example, tablet computers, laptops, desktops, and other network (e.g., cellular or internet protocol (IP) network) connected devices from which a call may be placed, a text may be sent, and/or data may be received. These devices are referred to collectively herein as the UE 130. The UE 130 may comprise a number of components to execute the above-mentioned functions and apps. As discussed below, the UE 130 may comprise memory 502 including many common features such as, for example, contacts 504, a calendar 506, a call log (or, call history) 508, and OS 510. In this case, the memory 502 may also store a marketplace app 512 and a provider app 514.

The UE 130 may also comprise one or more processors 516. In some implementations, the processor(s) 516 can be a central processing unit (CPU), a graphics processing unit (GPU), or both CPU and GPU, or any other sort of processing unit. The UE 130 may also include one or more of removable storage 518, non-removable storage 520, one or more transceiver(s) 522, output device(s) 524, and input device(s) 526. In some examples, the UE 130 may also include a physical SIM 528 and/or an e-SIM 530 including an International Mobile Subscriber Identity (IMSI) and other relevant information.

In various implementations, the memory 502 may be volatile (such as random-access memory (RAM)), non-volatile (such as read only memory (ROM), flash memory, etc.), or some combination of the two. The memory 502 may include all, or part, of the functions 504, 506, 508, 512, 514 and the OS 510 for the UE 130, among other things.

The memory 502 may also comprise contacts 504, which can include names, numbers, addresses, and other information about the user's business and personal acquaintances, among other things. In some examples, the memory 502 may also include a calendar 506, or other software, to enable the user to track appointments and calls, schedule meetings, and provide similar functions. In some examples, the memory 502 may also comprise the call log 508 of calls received, missed, and placed from the UE 130. As usual, the call log 508 may include timestamps for each call for use by the system 100. Of course, the memory 502 can also include other software such as, for example, e-mail, text messaging, social media, and utilities (e.g., calculators, clocks, compasses, etc.).

The memory 502 may also include the OS 510. Of course, the OS 510 varies depending on the manufacturer of the UE 130 and currently comprises, for example, iOS 12.1.4 for Apple products and Pie for Android products. The OS 510 contains the modules and software that supports a computer's basic functions, such as scheduling tasks, executing applications, and controlling peripherals.

As mentioned above, the UE 130 may also include the marketplace app 512. The marketplace app 512 may perform some, or all, of the functions discussed above with respect to the methods 200, 300, 400, 400 for interactions occurring between the UE 130 and the virtual SIM marketplace 110. Thus, the marketplace app 512 may receive user input, generate user requests in the appropriate format, and transmit the user requests to the virtual SIM marketplace 110. The marketplace app 512 may also receive a message from the virtual SIM marketplace 110 indicating the user request has been received, matched to a provider 120 (e.g., the first provider 120A), or cannot be fulfilled. The marketplace app 512 may also receive a message from the virtual SIM marketplace 110 indicating the user request cannot be fulfilled exactly, but providing one or more alternatives with features similar to those in the request.

The marketplace app 512 may also receive periodic updates and/or notifications from the virtual SIM marketplace 110. The updates and/or notifications may include new services, new service details, and/or new contract terms. If the user currently has unlimited talk and text for $40/month and a second provider 120B provides a new service listing for unlimited talk and text for $35/month, for example, the marketplace app 512 may provide the user with a notification including the new, better deal. Of course, the user may choose to stay with the current provider (e.g., the first provider 120A) due to better network reliability, reception issues, better customer service, etc.

The UE 130 may also include the provider app 514. The provider app 514 may facilitate communication between the UE 130 and the providers 120 (e.g., providers 120A-120n). The provider app 514 may receive, for example, the SIM-OTA message from one of the providers 120. The provider app 514 may also configure the e-SIM 530 using the configurations provided in the SIM-OTA message. The e-SIM 530 may use the SIM-OTA message to generate a first virtual SIM 532A. Based on the SIM-OTA message, the e-SIM 530 may associate one or more requested services with the first virtual SIM 532A and the matching provider 120. In some examples, the requested service may be replacing an existing service, but switching to a different provider 120, or replacing an existing service with a different service listing (e.g., the same provider 120 came out with a new deal for the same service(s)). In those examples, if the existing service is associated with the first virtual SIM 532A, the e-SIM 530 may remove the existing service from the first virtual SIM 532A and generate a second virtual SIM 532B. Further, the e-SIM 530 may associate the requested service with the second virtual SIM 532B.

The UE 130 may also include additional data storage devices (removable and/or non-removable) such as, for example, magnetic disks, optical disks, or tape. Such additional storage is illustrated in FIG. 5 by removable storage 518 and non-removable storage 520. The removable storage 518 and non-removable storage 520 can store some, or all, of the functions 504, 506, 508, 512, 514 and the OS 510.

Non-transitory computer-readable media may include volatile and nonvolatile, removable and non-removable tangible, physical media implemented in technology for storage of information, such as computer readable instructions, data structures, program modules, or other data. The memory 502, removable storage 518, and non-removable storage 520 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile disks (DVD) or other optical storage, magnetic cassettes, magnetic tape, magnetic disk storage or other magnetic storage devices, or any other tangible, physical medium which can be used to store the desired information and which can be accessed by the UE 130. Any such non-transitory computer-readable media may be part of the UE 130 or may be a separate database, databank, remote server, or cloud-based server.

In some implementations, the transceiver(s) 522 include any sort of transceivers known in the art. In some examples, the transceiver(s) 522 can include wireless modem(s) to facilitate wireless connectivity with the other UEs, the Internet, and/or an intranet via a cellular connection. Further, the transceiver(s) 522 may include a radio transceiver that performs the function of transmitting and receiving radio frequency communications via antenna 534 (e.g., Wi-Fi or Bluetooth®). In some examples, the transceiver 522 may include a plurality of antennas 534A-n.

In some examples, each of the plurality of antennas 534A-n may correspond to a respective virtual SIM 532 and a designated communication frequency or frequency pair. This can enable each virtual SIM 532 to use a dedicated antenna for communications, obviating the need for traffic controls, multiplexing, etc. The communication frequency may be specific to the provider 120 and/or to the type of service (e.g., talk, text, or IoT) associated with the respective virtual SIM 532, for example, the virtual SIM 532 may be programmed by the SIM-OTA message to communicate at a designated frequency for text services. Additionally, the communication frequency may be, at least in part, based on the type of service (e.g., 2G, 3G, 4G, or 5G) used by the respective virtual SIM 532. Therefore, the virtual SIM 532 may communicate at a variety of frequencies based on the available type of service. In other words, different portions of the communications spectrum are dedicated to 3G communication than, for example, 4G long-term evolution (LTE) communications. Furthermore, the e-SIM 530 may determine the type of communication (e.g., text or talk), the available frequencies, the available providers, etc. and route communications to the appropriate virtual SIM 532.

In some examples, UE 130 may include only one antenna (e.g., antenna 534) that provides communications for all of the virtual SIMs 532A-n. In those examples, the e-SIM 530 can identify the provider 120, the type of service, and/or the quality service and determine an appropriate communication frequency. Next, the e-SIM 530 can communicate the appropriate frequency to the appropriate virtual SIM 532. The e-SIM 530 may determine the appropriate virtual SIM 532 based on matching the provider 120, type of service, and/or quality of service to the corresponding values assigned to the virtual SIM 532.

In this configuration, the e-SIM 530, transceiver 522, OS 510, or other component of the UE 130, can act as "traffic cop" to prevent interference between the various virtual SIMS. In other words, as packets are sent and received for voice and text messages occurring contemporaneously on the UE 130—i.e., the user is texting and talking on the phone at the same time—the transceiver 522, for example, can switch back and forth between the appropriate frequencies on the antenna to effect both types of communications. This may be done on a time basis (e.g., first-in-first-out), a priority basis (e.g., voice takes precedence over text), or any other suitable method. This can enable the UE 130 to use multiple virtual SIMS 532 on multiple frequencies with multiple providers, for example, at the same time.

In other examples, the transceiver(s) 522 may include wired communication components, such as a wired modem or Ethernet port, for communicating with the other UE or the provider's Internet-based network. In this case, the transceiver(s) 522 can also enable the UE 130 to communicate with the virtual SIM marketplace 110 and the providers 120, as described herein.

In some implementations, the output device(s) 524 include any sort of output devices known in the art, such as a display (e.g., a liquid crystal or thin-film transistor (TFT) display), a touchscreen display, speakers, a vibrating mechanism, or a tactile feedback mechanism. In some examples, the output device(s) 524 can play various sounds based on, for example, whether the UE 130 is connected to a network, the type of call being received (e.g., video calls vs. voice calls), the number of active calls, etc. In some examples, the output device(s) can play a sound when a new service listing is requested, a match is found for a user request, a new SIM-OTA message is received, etc. Output device(s) 524 also include ports for one or more peripheral devices, such as headphones, peripheral speakers, or a peripheral display.

In various implementations, input device(s) 526 include any sort of input devices known in the art. The input device(s) 526 may include, for example, a camera, a microphone, a keyboard/keypad, or a touch-sensitive display. A keyboard/keypad may be a standard push button alphanumeric, multi-key keyboard (such as a conventional QWERTY keyboard), virtual controls on a touchscreen, or one or more other types of keys or buttons, and may also include a joystick, wheel, and/or designated navigation buttons, or the like.

The UE 130 can also include a physical SIM 528. The physical SIM 528 can comprise a removable card that includes UE data, user data, provider data, etc. In some examples, the physical SIM 528 may be linked to the user's primary provider 120, for example, or the provider 120 from which the UE 130 was originally obtained, among other things. The physical SIM 528 may be used to establish an initial connection with a network, for example, to enable the UE 130 to access the virtual SIM marketplace 110.

The e-SIM 530 can also include one or more virtual SIMS 532 (e.g., virtual SIMS 532A-532n). The virtual SIMS 532, in conjunction with the virtual SIM marketplace 110, can enable the user to dynamically change the services, service providers, service listings, etc. on the UE 130. Indeed, the virtual SIMS 532 can also enable the UE 130 to access different services using different providers 120 at the same time. The UE 130 may concurrently receive text messaging services from the first provider 120A, for example, and voice services from the second provider 120B. When a service is changed on the UE 130, new virtual SIMs 532 may be added and provisioned and/or existing virtual SIMS 532 may be re-provisioned or deleted.

Figure 6A:
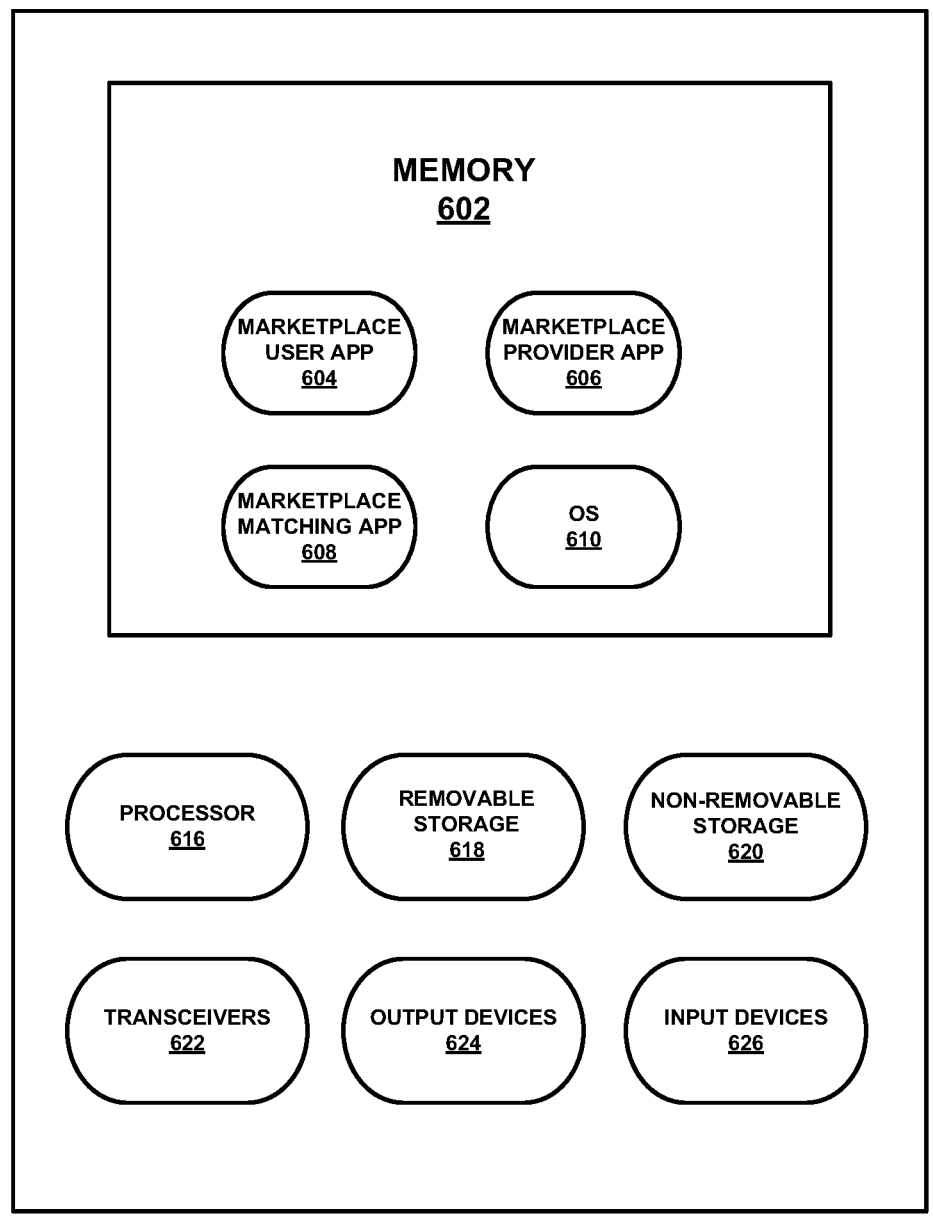
FIGS. 6A-B are examples of a marketplace server and a provider server, respectively, in accordance with some examples of the present disclosure.
Figure 6B:
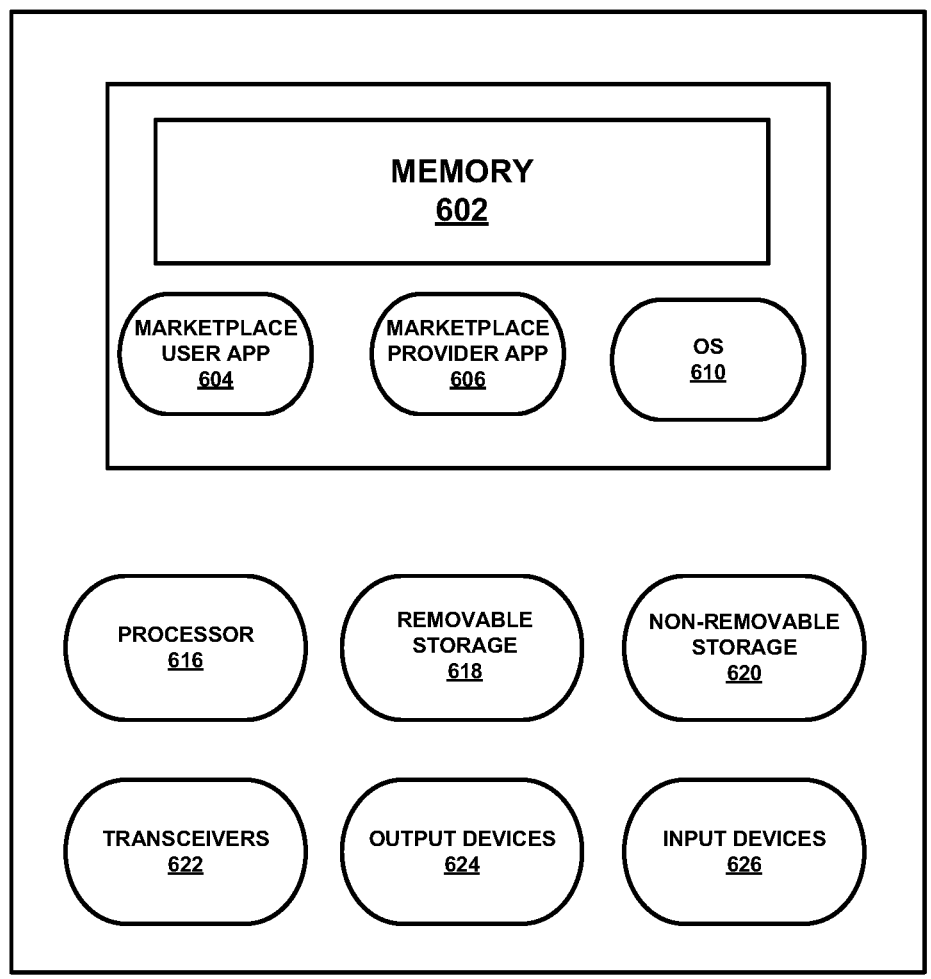

As shown in FIGS. 6A-B, the system 100 and methods 200, 300, 400 may also be used in conjunction with a marketplace server 600A and a provider server 600B. The servers 600 can comprise, for example, a desktop or laptop computer, a server, bank of servers, or cloud-based server bank. Thus, while the servers 600 are depicted as single standalone servers, other configurations or existing components could be used. In some examples, the servers 600 may comprise existing network entities such as, for example, a home location register (HLR), home subscriber service (HSS), a third-generation partnership project authentication, authorization and accounting (3GPP AAA) server, or another server or component.

The servers 600 may be substantially similar and may perform many of the same functions. The servers 600 may comprise a number of components to execute the above-mentioned functions and apps. As discussed below, the servers 600 may comprise memory 602 including many common features such as, for example, the OS 610.

In various implementations, the memory 602 may be volatile (such as random-access memory (RAM)), non-volatile (such as read only memory (ROM), flash memory, etc.), or some combination of the two. The memory 602 may include all, or part, of the functions of a marketplace user app 604, a marketplace provider app 606, and a marketplace matching app 608 on the marketplace server 600A, among other things. Similarly, on the provider server 600B, the memory 602 may include all, or part, of the functions of the marketplace user app 604, and the marketplace provider app 606, among other things.

The memory 602 may also include the OS 610. Of course, the OS 610 varies depending on the manufacturer of the server 600 and the type of component. Many servers, for example, run Linux or Windows Server. Dedicated cellular routing servers may run specific telecommunications OS 610. The OS 610 contains the modules and software that supports a computer's basic functions, such as scheduling tasks, executing applications, and controlling peripherals.

As shown in FIG. 6A, the marketplace server 600A can incorporate the virtual SIM marketplace 110. To this end, the marketplace user app 604 may provide communication between the marketplace server 600A, the providers 120, and the UEs 130 (e.g., UEs 130A-n). Thus, the marketplace user app 604 may receive the user request and/or the user data from the UE 130 and attempt to match the request with current service listings. If a match can be found, the marketplace user app 604 may communicate the match to the user. If a match cannot be found, on the other hand, the marketplace user app 604 may transmit a message to the UE 130 to provide service listings that are similar to the request or to tell the user the request cannot be matched.

The marketplace provider app 606 may provide communication between the virtual SIM marketplace 110 and the providers 120 (e.g., providers 120A-120n). For example, the marketplace provider app 606 may request and receive the service listings from each of the providers 120. Also, the marketplace matching app 608 may determine whether a user request received at the marketplace user app 604 matches a service listing received at the marketplace provider app 606 (i.e., whether there is a matching provider 120). When there is a matching provider 120 (e.g., the first provider 120A), the virtual SIM marketplace 110 may send the user data (e.g., customer information, UE information, user preference, requested service, etc.), via the marketplace provider app 606, to the first provider 120A.

As shown in FIG. 6B, each provider 120 may have one or more provider servers 600B for communicating with the virtual SIM marketplace 110 and/or the UEs 130. The provider server 600B may also include the marketplace user app 604 and the marketplace provider app 606. In this case, the marketplace user app 604 may provide communication between the providers 120 and the UE 130. The marketplace user app 604 may transmit the SIM-OTA messages to the UEs 130 when a match is identified by the virtual SIM marketplace 110. The marketplace provider app 606, on the other hand, may provide communication between the providers 120 and the virtual SIM marketplace 110. The providers 120 may receive the request for the service listings from the virtual SIM marketplace 110 and transmit one or more service listings via the marketplace provider app 606.

Both servers 600 may also include additional data storage devices (removable and/or non-removable) such as, for example, magnetic disks, optical disks, or tape. Such additional storage is illustrated in FIGS. 6A and 6B by removable storage 618 and non-removable storage 620. The removable storage 618 and non-removable storage 620 may store some, or all, of the OS 610 and functions 604, 606.

Non-transitory computer-readable media may include volatile and nonvolatile, removable and non-removable tangible, physical media implemented in technology for storage of information, such as computer readable instructions, data structures, program modules, or other data. The memory 602, removable storage 618, and non-removable storage 620 are all examples of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which may be used to store the desired information, and which can be accessed by the servers 600. Any such non-transitory computer-readable media may be part of the servers 600 or may be a separate database, databank, remote server, or cloud-based server.

In some implementations, the transceiver(s) 622 include any sort of transceivers known in the art. In some examples, the transceiver(s) 622 may include wireless modem(s) to facilitate wireless connectivity with the UEs 130, the virtual SIM marketplace 110, the Internet, and/or an intranet via a cellular connection. Further, the transceiver(s) 622 may include a radio transceiver that performs the function of transmitting and receiving radio frequency communications via an antenna (e.g., Wi-Fi or Bluetooth®). In other examples, the transceiver(s) 622 may include wired communication components, such as a wired modem or Ethernet port, for communicating with the other UEs or the provider's Internet-based network. The transceiver(s) 622 may receive requests and matches from the virtual SIM marketplace 110, transmit service listings to the virtual SIM marketplace 110, and send SIM-OTA messages to the UEs 130, among other things.

In some implementations, the output device(s) 624 include any sort of output devices known in the art, such as a display (e.g., a liquid crystal or thin-film transistor (TFT) display), a touchscreen display, speakers, a vibrating mechanism, or a tactile feedback mechanism. In some examples, the output devices may play various sounds based on, for example, whether the server 600 is connected to a network, the type of data being received (e.g., a match vs. a request for service listings), when SIM-OTA messages are being transmitted, etc. Output device(s) 624 also include ports for one or more peripheral devices, such as headphones, peripheral speakers, or a peripheral display.

In various implementations, input device(s) 626 include any sort of input devices known in the art. For example, the input device(s) 626 may include a camera, a microphone, a keyboard/keypad, or a touch-sensitive display. A keyboard/keypad may be a standard push button alphanumeric, multi-key keyboard (such as a conventional QWERTY keyboard), virtual controls on a touchscreen, or one or more other types of keys or buttons, and may also include a joystick, wheel, and/or designated navigation buttons, or the like.

While several possible examples are disclosed above, examples of the present disclosure are not so limited. While the system 100 and methods 200, 300, 400 above are discussed with reference to use with cellular communications, for instance, the system 100 and methods 200, 300, 400 can be used to provide a marketplace for other types of wired and wireless communications. In addition, while various functions are discussed as being performed on the UE 130, by the provider 120, or by the virtual SIM marketplace 110, other components could perform the same or similar functions without departing from the spirit of the invention.

The specific configurations, machines, and the size and shape of various elements can be varied according to particular design specifications or constraints requiring a UE 130, server 600, system 100, or method 200, 300, 400 constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A method for dynamic subscriber identity module (SIM) provisioning comprising:
    transmitting, with a transceiver of a user device, a first user request to a first server associated with a virtual SIM marketplace, the first user request including a first service and at least one of user device information, customer information, or a first user preference;
    receiving, by a processor of the user device, a first SIM over-the-air (SIM-OTA) message from a second server associated with a first service provider; and
    programming, with the processor, the user device using the first SIM-OTA message to enable the user device to provide the first service, wherein programming the user device using the first SIM-OTA message further comprises:
        determining that the first service is an existing service on a first virtual SIM;
        generating a second virtual SIM using at least a portion of data from the first SIM-OTA message;
        removing the first service from the first virtual SIM; and
        associating the first service with the second virtual SIM based on the first SIM-OTA message.

2. The method of claim 1, further comprising:
    transmitting, with the transceiver, a second user request to the first server including a second service and at least one of the user device information, the customer information, or a second user preference;
    receiving, by the processor, a second SIM over-the-air (SIM-OTA) message from a third server associated with a second service provider; and
    programming, with the processor, the user device using the second SIM-OTA message to enable the user device to provide the second service.

3. The method of claim 2, wherein the first service comprises one of voice, data, text messaging, or internet of things (IOT) data; and
    wherein the second service comprises another of voice, data, text messaging, or internet of things (IOT) data.

4. The method of claim 2, wherein the user device comprises a plurality of antennas; and
    wherein programming the user device using the first SIM-OTA message further comprises:
        generating, with the processor, a first virtual SIM using at least a portion of data from the first SIM-OTA message, the first virtual SIM associated with the first service; and
        assigning, with the processor, a first antenna of the plurality of antennas to be used in association with the first virtual SIM; and
    wherein programming the user device using the second SIM-OTA message further comprises:
        generating, with the processor, the second virtual SIM using at least a portion of data from the second SIM-OTA message, the second virtual SIM associated with the second service; and
        assigning, with the processor, a second antenna of the plurality of antennas to be used in association with the second virtual SIM.

5. The method of claim 1, wherein the user device comprises a single antenna, and wherein the first virtual SIM and the second virtual SIM are of a plurality of virtual SIMs, the method further comprising:
    receiving, at the processor, a first transmission data packet from the first virtual SIM at a first time;
    receiving, at the processor, a second transmission data packet from the second virtual SIM at a second time;
    determining, with the processor, that the first time is before the second time;
    sending, with the processor, the first transmission data packet to a transceiver of the user device for transmission by the antenna at a third time; and
    sending, with the processor, the second transmission data packet to the transceiver for transmission by the antenna at a fourth time;
    wherein the fourth time is after the third time.

6. The method of claim 1, wherein programming the user device using the first SIM-OTA message further comprises:
    determining the user device lacks the first service;
    generating a virtual SIM using at least a portion of data from the first SIM-OTA message; and
    associating the first service with the virtual SIM based on the first SIM-OTA message.

7. A user equipment (UE) comprising:
    a transceiver;
    a processor; and
    a memory having stored thereon computer program code that, when executed by the processor, controls the processor to:

output for transmission, via the transceiver, a first user request to a first server associated with a virtual SIM marketplace, the first user request including a first service and at least one of UE information, customer information, or a first user preference;

receive, via the transceiver, a first SIM over-the-air (SIM-OTA) message from a second server associated with a first service provider; and program the UE using the first SIM-OTA message to enable the UE to provide the first service, wherein programming the UE using the first SIM-OTA message comprises:

determining that the first service is an existing service on a first virtual SIM;

generating a second virtual SIM using at least a portion of data from the first SIM-OTA message;

removing the first service from the first virtual SIM; and associating the first service with the second virtual SIM based on the first SIM-OTA message.

8. The UE of claim 7, wherein the computer program code, when executed by the processor, further controls the processor to:

output for transmission, via the transceiver, a second user request to the first server including a second service and at least one of the UE information, the customer information, or a second user preference;

receive, via the transceiver, a second SIM over-the-air (SIM-OTA) message from a third server associated with a second service provider; and program the UE using the second SIM-OTA message to enable the UE to provide the second service.

9. The UE of claim 8, wherein the first service comprises one of voice, data, text messaging, or internet of things (IOT) data; and wherein the second service comprises another of voice, data, text messaging, or internet of things (IOT) data.

10. The UE of claim 8 further comprising a plurality of antennas, wherein programming the UE using the first SIM-OTA message comprises:

generating, with the processor, a first virtual SIM using at least a portion of data from the first SIM-OTA message, the first virtual SIM associated with the first service; and assigning, with the processor, a first antenna of the plurality of antennas to be used in association with the first virtual SIM; and programming the UE using the second SIM-OTA message comprises:

generating, with the processor, the second virtual SIM using at least a portion of data from the second SIM-OTA message, the second virtual SIM associated with the second service; and assigning, with the processor, a second antenna of the plurality of antennas to be used in association with the second virtual SIM.

11. The UE of claim 7 further comprising a single antenna, wherein the first virtual SIM and the second virtual SIM are of a plurality of virtual SIMs, and wherein the computer program code, when executed by the processor, further controls the processor to receive a first transmission data packet from the first virtual SIM at a first time;

receive a second transmission data packet from the second virtual SIM at a second time;

determine that the first time is before the second time;

output the first transmission data packet to the transceiver for transmission by the antenna at a third time; and output the second transmission data packet to the transceiver for transmission by the antenna at a fourth time, the fourth time being after the third time.

12. The UE of claim 7, wherein programming the UE using the first SIM-OTA message comprises:

determining the UE lacks the first service;

generating a virtual SIM using at least a portion of data from the first SIM-OTA message; and associating the first service with the virtual SIM based on the first SIM-OTA message.

13. A non-transitory computer readable medium having stored thereon instructions for a method for dynamic subscriber identity module (SIM) provisioning, the method comprising:

transmitting, with a transceiver of a user equipment (UE), a first user request to a first server associated with a virtual SIM marketplace, the first user request including a first service and at least one of UE information, customer information, or a first user preference;

receiving, by a processor of the UE, a first SIM over-the-air (SIM-OTA) message from a second server associated with a first service provider; and programming, with the processor, the UE using the first SIM-OTA message to enable the UE to provide the first service, wherein programming the UE using the first SIM-OTA message further comprises:

determining that the first service is an existing service on a first virtual SIM;

generating a second virtual SIM using at least a portion of data from the first SIM-OTA message;

removing the first service from the first virtual SIM; and associating the first service with the second virtual SIM based on the first SIM-OTA message.

14. The computer readable medium of claim 13, wherein the method further comprises:

transmitting, with the transceiver, a second user request to the first server including a second service and at least one of the UE information, the customer information, or a second user preference;

receiving, by the processor, a second SIM over-the-air (SIM-OTA) message from a third server associated with a second service provider; and programming, with the processor, the UE using the second SIM-OTA message to enable the UE to provide the second service.

15. The computer readable medium of claim 14, wherein the first service comprises one of voice, data, text messaging, or internet of things (IOT) data; and wherein the second service comprises another of voice, data, text messaging, or internet of things (IOT) data.

16. The computer readable medium of claim 14, wherein the UE comprises a plurality of antennas and programming the UE using the first SIM-OTA message comprises:

generating, with the processor, a first virtual SIM using at least a portion of data from the first SIM-OTA message, the first virtual SIM associated with the first service; and assigning, with the processor, a first antenna of the plurality of antennas to be used in association with the first virtual SIM; and programming the UE using the second SIM-OTA message comprises:

generating, with the processor, a second virtual SIM using at least a portion of data from the second SIM-OTA message, the second virtual SIM associated with the second service; and assigning, with the processor, a second antenna of the plurality of antennas to be used in association with the second virtual SIM.

17. The computer readable medium of claim 13, wherein the UE comprises a single antenna, and wherein the first virtual SIM and the second virtual SIM are of a plurality of virtual SIMs, the method further comprising:

receiving, at the processor, a first transmission data packet from the first virtual SIM at a first time;

receiving, at the processor, a second transmission data packet from the second virtual SIM at a second time;

determining, with the processor, that the first time is before the second time;

sending, with the processor, the first transmission data packet to the transceiver for transmission by the antenna at a third time; and sending, with the processor, the second transmission data packet to the transceiver for transmission by the antenna at a fourth time, the fourth time being after the third time.

* * * * *